US008667183B1

(12) United States Patent
L'Heureux et al.

(10) Patent No.: US 8,667,183 B1
(45) Date of Patent: Mar. 4, 2014

(54) SERVER-SIDE HTTP TRANSLATOR

(76) Inventors: Israel L'Heureux, Monaco (MC); Mark D. Alleman, Portland, OR (US)

(*) Notice: Subject to any disclaimer, the term of this patent is extended or adjusted under 35 U.S.C. 154(b) by 368 days.

(21) Appl. No.: 13/052,074

(22) Filed: Mar. 20, 2011

(51) Int. Cl.
*G06F 15/16* (2006.01)

(52) U.S. Cl.
USPC ........... 709/249; 709/203; 709/247; 709/248; 709/250

(58) Field of Classification Search
USPC .................................. 709/203, 247, 248–251
See application file for complete search history.

(56) References Cited

U.S. PATENT DOCUMENTS

| | | | | |
|---|---|---|---|---|
| 6,065,043 | A * | 5/2000 | Domenikos et al. | 709/203 |
| 6,173,311 | B1 * | 1/2001 | Hassett et al. | 709/202 |
| 6,356,529 | B1 * | 3/2002 | Zarom | 370/231 |
| 2005/0229243 | A1 | 10/2005 | Svendsen et al. | |
| 2006/0143295 | A1 | 6/2006 | Costa-Requena et al. | |
| 2007/0185975 | A1 * | 8/2007 | Cunningham et al. | 709/217 |
| 2009/0060199 | A1 | 3/2009 | Von Mueller et al. | |
| 2009/0182843 | A1 | 7/2009 | Hluchyj et al. | |
| 2010/0011115 | A1 | 1/2010 | Kliland et al. | |
| 2010/0146067 | A1 | 6/2010 | Tapuska et al. | |
| 2010/0325299 | A1 | 12/2010 | Rao et al. | |
| 2011/0047294 | A1 | 2/2011 | Singh et al. | |
| 2011/0113250 | A1 | 5/2011 | Li et al. | |
| 2011/0119323 | A1 * | 5/2011 | Tani et al. | 709/203 |
| 2011/0131412 | A1 | 6/2011 | Grimsley et al. | |
| 2011/0137973 | A1 | 6/2011 | Wei et al. | |
| 2011/0145391 | A1 | 6/2011 | Ivershen | |
| 2011/0280257 | A1 | 11/2011 | Chakareski et al. | |
| 2012/0093150 | A1 | 4/2012 | Kini | |
| 2012/0144015 | A1 | 6/2012 | Jalan et al. | |

OTHER PUBLICATIONS

Israel L'Heureux and Mark D. Alleman, "Client-Side HTTP Translator", pending U.S. Appl. No. 13/104,522, filed at USPTO May 10, 2011, unpublished.
USPTO—USPTO Office Action for pending U.S. Appl. No. 13/104,522, notification date Jan. 16, 2013, unpublished.
Israel L'Heureux and Mark D. Alleman, Response to USPTO Office Action for pending U.S. Appl. No. 13/104,522, response filed at USPTO on Apr. 16, 2013, unpublished.
USPTO—USPTO Office Action for pending U.S. Appl. No. 13/104,522, notification date Aug. 8, 2013, unpublished.
USPTO Office Action, List of References Cited, Search Information, and Examiner's Search Strategy for pending U.S. Appl. No. 13/104,522, notification date Dec. 31, 2013, unpublished.

* cited by examiner

*Primary Examiner* — Frantz Jean
(74) *Attorney, Agent, or Firm* — Michael J. Andri

(57) ABSTRACT

A network communications system and method are disclosed. In at least one implementation, the network communications system includes a network appliance configured to receive from a client device via a client-side wide area network, an HTTP non-compliant request stream including one or more HTTP non-compliant requests formatted according to an HTTP non-compliant application level protocol. The network appliance is further configured to translate the one or more HTTP non-compliant requests of the HTTP non-compliant request stream from the HTTP non-compliant application level protocol into one or more HTTP compliant requests of an HTTP compliant request stream. The network appliance is further configured to forward the HTTP compliant request stream including the one or more HTTP compliant requests to one or more server devices via a server-side local area network.

12 Claims, 4 Drawing Sheets

SERVER-SIDE HTTP TRANSLATOR

BACKGROUND

Information networks such as the Internet typically rely on communication protocols for coordinating information flows between computing devices on the network. The Hypertext Transfer Protocol (HTTP) is a commonly used application level protocol for communicating on the Internet within the Transmission Control Protocol (TCP) transport layer of the Internet Protocol Suite. Recent advancements in application level protocols within the TCP framework, such as SPDY, HTTP-MPLEX, and other enhanced application level protocols may not be supported by HTTP compliant servers. Thus, clients and servers may be unable to effectively communicate with each other or communications may be degraded if different or unsupported application level protocols are utilized among such clients and servers. For website operators and software developers, updating clients and servers to support such enhanced application level protocols can be prohibitively costly and time consuming, driving up costs for end users. As a result, a patchwork of interoperability exists for such enhanced protocols, which slows their adoption.

SUMMARY

A network communications system and method are disclosed. In at least one implementation, the network communications system includes a network appliance configured to receive from a client device via a client-side wide area network, an HTTP non-compliant request stream including one or more HTTP non-compliant requests formatted according to an HTTP non-compliant application level protocol. The network appliance is further configured to translate the one or more HTTP non-compliant requests of the HTTP non-compliant request stream from the HTTP non-compliant application level protocol into one or more HTTP compliant requests of an HTTP compliant request stream. The network appliance is further configured to forward the HTTP compliant request stream including the one or more HTTP compliant requests to one or more server devices via a server-side local area network.

Claimed subject matter, however, is not limited by this summary as other implementations may be disclosed by the following written description and associated drawings.

DETAILED DESCRIPTION

A server-side HTTP translator is disclosed which facilitates network communications between client devices that support HTTP non-compliant application level protocols and server devices that support HTTP compliant application level protocols. The server-side HTTP translator may be implemented as a translator module of a network appliance located in a data center. The network appliance, for example, may serve as a SPDY proxy, HTTP-MPLEX proxy, or a proxy for other suitable enhanced application level protocols not compliant with the HTTP application level protocol. As used herein, an HTTP compliant application level protocol is compliant with the defined HTTP specification, such as RFC 1945/HTTP/1.0 and RFC 2616/HTTP/1.1. Further, SPDY refers to an enhanced application level protocol that has been developed by GOOGLE™, of Santa Clara, Calif. HTTP-MPLEX is a name given to an enhanced application level protocol proposed by Dr. Robert Mattson, Department of Computer Science and Computer Engineering, La Trobe University, Bundoora, Victoria, Australia.

Figure 1:
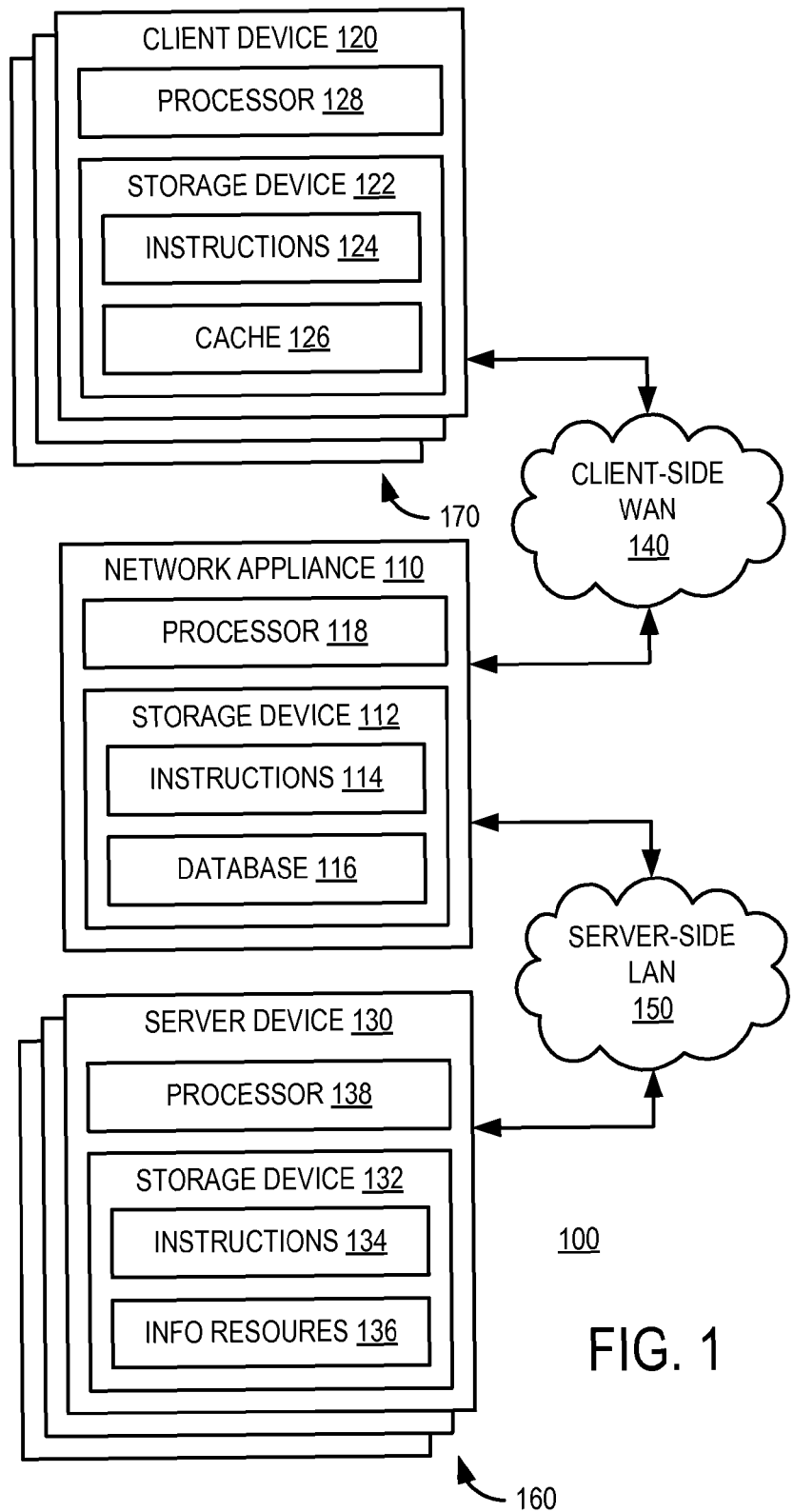
FIG. 1 is a schematic diagram depicting an example network communications system according to one disclosed embodiment.

FIG. 1 is a schematic diagram depicting an example network communications system 100 according to one disclosed embodiment. Network communications system 100 may include a number of computing devices, including a network appliance 110, one or more client devices 170 such as example client device 120, and one or more server devices 160 such as example server device 130. Network appliance 110 may facilitate network communications between client devices 170 and server devices 160 via respective client-side wide area network 140 and server-side local area network 150. As one example, network appliance 110 may connect thousands of client devices to hundreds of server devices of a server farm.

Network appliance 110 may include a storage device 112 having instructions 114 stored thereon executable by processor 118 to perform one or more of the methods, processes, or functions described herein with respect to a network appliance. For example, network appliance 110 may be configured to function (e.g., by executing instructions 114) as an intermediate networking device (e.g., application delivery controller, proxy server, server load balancer, intelligent switch, etc.) positioned in a network path between a client device and a server, which provides proxy functionality for SPDY or other suitable enhanced application level protocols not compliant with the HTTP application level protocol. As one example, instructions 114 may include an HTTP translator module for translating between HTTP compliant and HTTP non-compliant data streams as described in greater detail with reference to FIGS. 3 and 4. Instructions 114 may further include one or more other suitable modules for providing additional functionality beyond HTTP translation, including application delivery controller functions, encryption/decryption functions, buffering, etc.

In at least some implementations, network appliance 110 may be configured to function as a terminating network node. For example, TCP and/or TLS (transport level security) (e.g., SSL (secure socket layer) connections between client device 120 and server device 130 may terminate at network appliance 110. On the client-side of network appliance 110, TCP and/or TLS connections of client-side WAN 140 with respective client devices may terminate at network appliance 110. On the server-side of network appliance 110, TCP and/or TLS connections of server-side LAN 150 with respective server devices may terminate at network appliance 110. Network appliance 110 may be configured to inspect, modify, reject, or re-route requests and responses between client devices 170 and server devices 160 that utilize TCP and/or TLS protocols. In at least some implementations, network appliance 110 may be configured to demultiplex multiple requests from a request stream of an individual client device from an application level protocol specified number of client-side TCP connections (e.g., as defined by the particular HTTP non-compliant application level protocol utilized by the client device) to a programmatically specified number of persistent server-side TCP connections (e.g., as defined by instructions 114 of network appliance 110). As one example, the SPDY application level protocol may specify only a single client-side TCP connection for sending requests to network appliance 110. Network appliance 110 may be further configured to multiplex multiple requests of multiple client devices over the programmatically specified number of persistent server-side TCP connections to thereby reduce the number of persistent TCP connections between network appliance 110 and the server devices.

In at least some implementations, network appliance 110 may be configured to demultiplex multiple responses for multiple clients from a response stream received from a server device from the programmatically specified number of persistent server-side TCP connections to the application level protocol specified number of client-side TCP connections. Network appliance 110 may be further configured to multiplex multiple responses for an individual client device over the application level protocol specified number of client-side TCP connections. As one example, the SPDY application level protocol may specify only a single client-side TCP connection for receiving responses from network appliance 110.

Client device 120 may include a storage device 122 having instructions 124 stored thereon executable by processor 128 to perform one or more of the methods, processes, or functions described herein with respect to a client device. Instructions 124 of client device 120 may include a browser program (e.g., web browser or file browser) for retrieving and displaying information resources. A browser program of client device 120 may support one or more HTTP non-compliant application level protocols in addition to or exclusive of an HTTP compliant application level protocol supported by server device 130. As one example, a browser program of instructions 124 may be configured to multiplex multiple HTTP non-compliant requests over an application level protocol specified number of TCP connections (e.g., a single TCP connection) with network appliance 110. Network appliance 110 may be configured to establish one or more TCP connections with client device 120 in response to receiving a TCP establishment request from client device 120 via client-side wide area network 140. Client device 120 may comprise, for example, a personal computer, mobile device, or other suitable electronic device that may be operated by a human user.

Server device 130 may include a storage device 132 having instructions 134 stored thereon executable by processor 138 to perform one or more of the methods, processes, or functions described herein with respect to a server device. As one example, server device 130 may be configured to receive requests for information resources 136 stored at server device 130, and respond to such requests with the requested information resources. Server device 130 may support an HTTP compliant application level protocol. Server device 130 may comprise, for example, one of a plurality of server devices 160 in a data center. In at least some implementations, network appliance 110 may be included in a data center along with a plurality of server devices 160, including example server device 130. Network appliance 110 may be connected or connectable to each other via server-side LAN 150, for example, over one or more persistent TCP connections.

Network appliance 110 may be configured to receive an indication, such as a message, token, data element, etc., which indicates that client device 120 supports one or more application level protocols, including an HTTP non-compliant application level protocol. The indication may be received from client device 120 via client-side wide area network 140 over one or more TCP connections. Network appliance 110 may be configured to store the indication received from client device 120 at database 116 where it may be referenced by network appliance 110. For subsequent sessions, for example, network appliance 110 may be configured to receive the indication for the client from database 116 based on a client identifier, for example. Network appliance 110 may be configured to send an indication of one or more supported application level protocols to client device 120 via client side network 140 over one or more established TCP connections. As one example, the indication may be a message sent from the client device to the network appliance indicating that the client device is able to interpret data sent according to the SPDY protocol or other suitable HTTP non-compliant protocol.

Network appliance 110 may be configured to receive from one or more client devices such as client device 120 via client-side WAN 140 over one or more TCP connections, an HTTP non-compliant request stream including one or more HTTP non-compliant requests formatted according to an HTTP non-compliant application level protocol. Network appliance 110 may be configured to translate the one or more HTTP non-compliant requests of the HTTP non-compliant request stream from the HTTP non-compliant application level protocol into one or more HTTP compliant requests of an HTTP compliant request stream. Network appliance 110 may be configured to forward the HTTP compliant request stream including the one or more HTTP compliant requests to one or more server devices (e.g., server device 130) via server-side local area network 150 over one or more established TCP connections. TCP connections between network appliance 110 and server device 130 may include one or more pre-established persistent TCP connections in some implementations, or TCP connections may be established as needed, on the fly by network appliance 110 with server device 130. Server device 130 may be configured to receive, process, and respond to the HTTP compliant request stream by sending an HTTP compliant response stream to network appliance 110.

Network appliance 110 may be configured to receive the HTTP compliant response stream including one or more HTTP compliant responses from the one or more server devices (e.g., server device 130) via server-side local area network 150 over one or more TCP connections. The one or more HTTP compliant responses may be responsive to the one or more HTTP compliant requests, for example. Network appliance 110 may be configured to translate the one or more HTTP compliant responses of the HTTP compliant response stream into one or more HTTP non-compliant responses of an HTTP non-compliant response stream formatted according to the HTTP non-compliant application level protocol. Network appliance 110 may be configured to forward the HTTP non-compliant response stream to one or more client devices such as client device 120 via client-side wide area network 140 over the one or more established TCP connections. Client device 120 may be configured to receive and process the HTTP non-compliant response stream, and may be configured to store information contained therein at cache 126.

Figure 2:
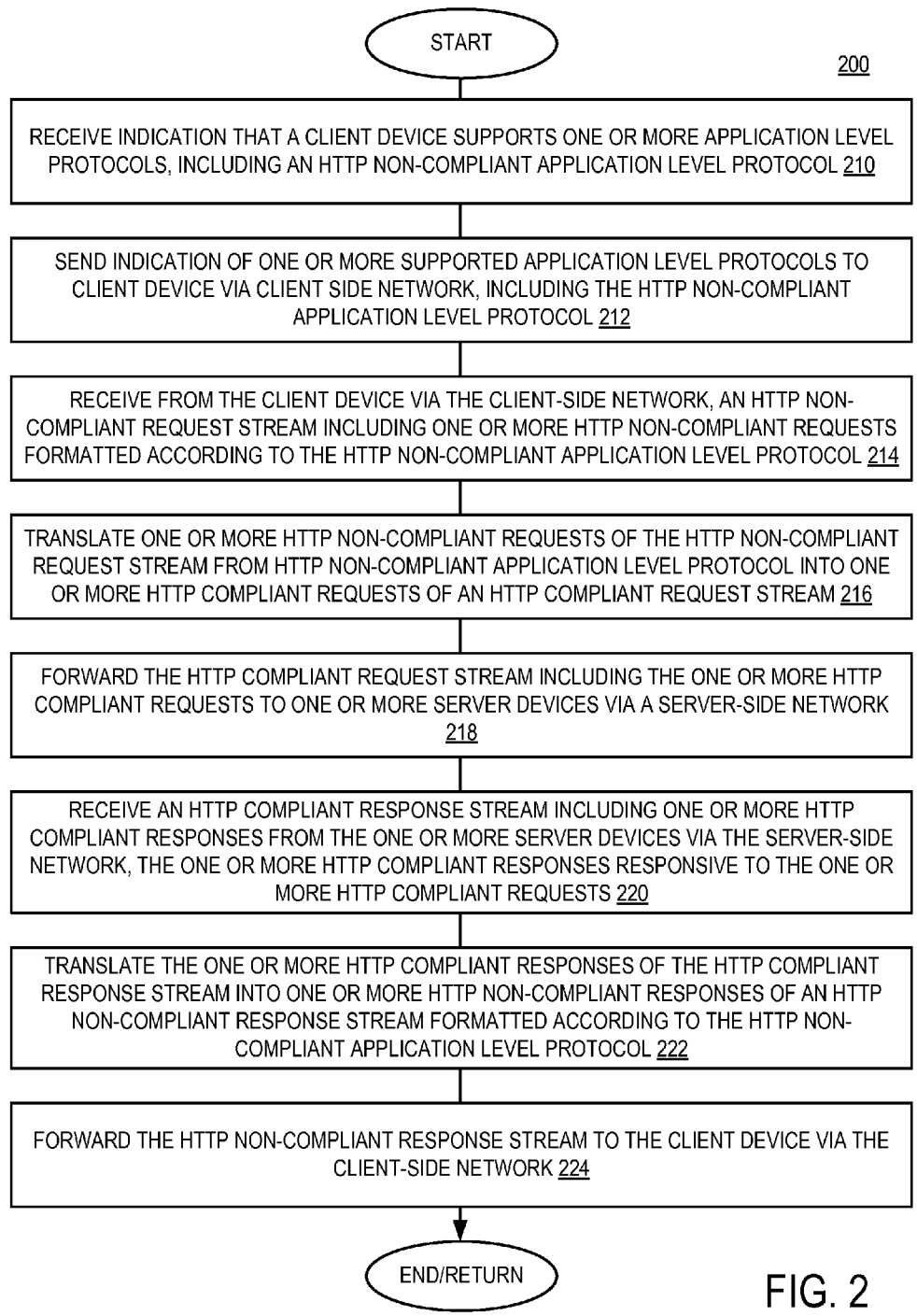
FIG. 2 is a flow diagram depicting an example network communications method according to one disclosed embodiment.

FIG. 2 is a flow diagram depicting an example network communications method 200 according to one disclosed embodiment. As one example, method 200 may be performed, at least in part, by previously described network appliance 110 of FIG. 1. Accordingly, method 200 may be implemented as instructions (e.g., instructions 114) executed by a processor of a network appliance (e.g., network appliance 110) or other suitable computing device.

At 210, the method includes receiving an indication of one or more application level protocols supported by a client device. As one example, the received indication may indicate that the client device supports an HTTP non-compliant application level protocol. For example, a browser program at the client device may support an HTTP non-compliant application level protocol in addition to or exclusive to an HTTP compliant application level protocol. A protocol initiation request may be initiated by and may be received from a client device via a client-side wide area network over one or more TCP connections, which indicates that the client device supports an HTTP non-compliant application level protocol, such as SPDY, for example. The protocol initiation request may be accompanied by or may include a client device identifier (e.g., IP address, client specific ID number or token, etc.) and/or browser program identifier (e.g., browser program type and/or version number) in at least some implementations. The indication received from the client device may be stored at a database in association with the client identifier or browser program identifier where it may be available for reference. For subsequent sessions, for example, the database may be referenced to receive the indication that the client device supports the HTTP non-compliant application level protocol rather than or in addition to receiving the indication from the client device. Accordingly, the application level protocol supported by the client device may be identified from an indication provided by the client device in a previous session based on information contained in a database.

At 212, the method includes sending an indication of one or more supported application level protocols to the client device via the client side network. As one example, the previously described network appliance may select one or more application level protocols from the one or more application protocols supported by the client device based on the indication received at 210. The network appliance may send a message that indicates the one or more supported application level protocols to the client device via the client-side wide area network, for example. The client device receives the indication of the one or more supported application level protocols, and may send requests for information resources that are formatted according to a select one of the supported application level protocols supplied by the client device.

At 214, the method includes receiving a request stream from the client device via the client-side wide area network over one or more TCP connections established with the client device. In at least some implementations, the request stream may include an HTTP non-compliant request stream including one or more HTTP non-compliant requests formatted according to an HTTP non-compliant application level protocol. The HTTP non-compliant request stream may include multiple HTTP non-compliant requests multiplexed over a single TCP connection in at least some implementations, such as where the HTTP non-compliant application level protocol is the SPDY application level protocol.

At 216, the method includes translating the one or more HTTP non-compliant requests of the HTTP non-compliant request stream from the HTTP non-compliant application level protocol into one or more HTTP compliant requests of an HTTP compliant request stream. As one example, translating the one or more HTTP non-compliant requests of the HTTP non-compliant request stream into the one or more HTTP compliant requests of the HTTP compliant request stream may include or may be performed by demultiplexing the one or more HTTP non-compliant requests from an application level protocol specified number of client-side TCP connections. As another example, translating the one or more HTTP non-compliant requests of the HTTP non-compliant request stream into the one or more HTTP compliant requests of the HTTP compliant request stream may include or may be performed by uncompressing respective headers of the one or more HTTP non-compliant requests to the one or more HTTP compliant requests. In at least some implementations, the method may further include decrypting the HTTP non-compliant request stream prior to translating the HTTP non-compliant request stream.

At 218, the method includes forwarding the HTTP compliant request stream including the one or more HTTP compliant requests to one or more server devices via a server-side local area network over one or more TCP connections established with the one or more server devices. In at least some implementations, the one or more HTTP compliant requests of the HTTP compliant request stream may be sent to the one or more server devices over a programmatically specified number of TCP connections, in contrast, for example, to the multiplexed HTTP non-compliant requests of the HTTP non-compliant request stream that may be received from the client device, for example, over an application level protocol specified number of TCP connections (e.g., a single TCP connection for the SPDY application level protocol). Furthermore, in at least some implementations, multiple HTTP compliant requests of multiple client devices may be multiplexed over a given TCP connection with a server device as will be described in greater detail with reference to FIGS. 3 and 4.

In at least some implementations, the method may further include encrypting or re-encrypting the HTTP compliant request stream prior to forwarding the HTTP compliant request stream to the one or more server devices. The one or more server devices may receive, decrypt, process, and respond to the one or more HTTP compliant requests of the HTTP compliant request stream by sending an HTTP compliant response stream via the server-side local area network over one or more established TCP connections.

At 220, the method includes receiving an HTTP compliant response stream including one or more HTTP compliant responses from the one or more server devices via the server-side local area network. The one or more HTTP compliant responses may be responsive to the one or more HTTP compliant requests forwarded to the one or more server devices. In at least some implementations, HTTP compliant responses may be received from the one or more server devices over the programmatically specified number of TCP connections between the network appliance and the one or more server devices. Furthermore, in at least some implementations, multiple HTTP compliant responses for multiple client devices may be multiplexed by a server device over a given TCP connection between the network appliance and the server device as will be described in greater detail with reference to FIGS. 3 and 4. In at least some implementations, the method at 220 may further include demultiplexing the one or more HTTP compliant responses for the client device from one or more other HTTP compliant responses for one or more other client devices.

At 222, the method includes translating the one or more HTTP compliant responses of the HTTP compliant response stream for a given client device into one or more HTTP non-compliant responses of an HTTP non-compliant response stream formatted according to the HTTP non-compliant application level protocol. As one example, translating the one or more HTTP compliant responses of the HTTP compliant response stream may include or may be performed by multiplexing the HTTP compliant responses for the given client device to the application level protocol specified number of TCP connections for the browser program of the client device. For example, in the context of SPDY, a plurality of HTTP non-compliant requests multiplexed over a single TCP connection on the client-side of the network appliance by a given client device may be responded to by the network appliance by sending a corresponding plurality of HTTP non-compliant responses to the client device multiplexed over a single TCP connection.

As another example, translating the one or more HTTP compliant responses of the HTTP compliant response stream may include or may be performed by compressing respective headers of the one or more HTTP compliant responses to the one or more HTTP non-compliant responses. In at least some implementations, the method may include decrypting the HTTP compliant response stream prior to translating the HTTP compliant response stream.

At 224, the method may include forwarding the HTTP non-compliant response stream including the one or more HTTP non-compliant responses to the client device via the client-side wide area network over one or more TCP connections. The client device may receive the HTTP non-compliant response stream via the client-side wide area network, and processes the HTTP non-compliant response stream at a browser program, for example, that supports the HTTP non-compliant application level protocol. In at least some implementations, the method may further include encrypting or re-encrypting the HTTP non-compliant response stream prior to forwarding the HTTP non-compliant response stream to the client device.

In at least some implementations, method 200 may further include identifying a performance parameter of an existing TCP connection between the network appliance and the client device, and initiating a new TCP connection with the client device based, at least in part, on the performance parameter of the existing TCP connection exceeding a threshold. The performance parameter may include, for example, one or more of a round trip time, packet loss, TCP receive window, or congestion window. As one example, if the round trip time (e.g., as measured by or at the network appliance) of a pre-existing TCP connection between the network appliance and the client device exceeds a threshold round trip time or packet loss exceeds a threshold packet loss, then the network appliance may send a redirect message to the client device for a different TCP port of the network appliance to cause the client device to open a new TCP connection to the network appliance. As another example, if the TCP receive window for a given TCP connection (e.g., as measured by or at the client device, and communicated to the network appliance) is less than a threshold TCP receive window or if a congestion window (e.g., as measured by or at the network appliance) is less than a threshold congestion window, then the network appliance may send a redirect message to the client device for a different TCP port of the network appliance to cause the client device to open a new TCP connection to the network appliance.

Figure 3:
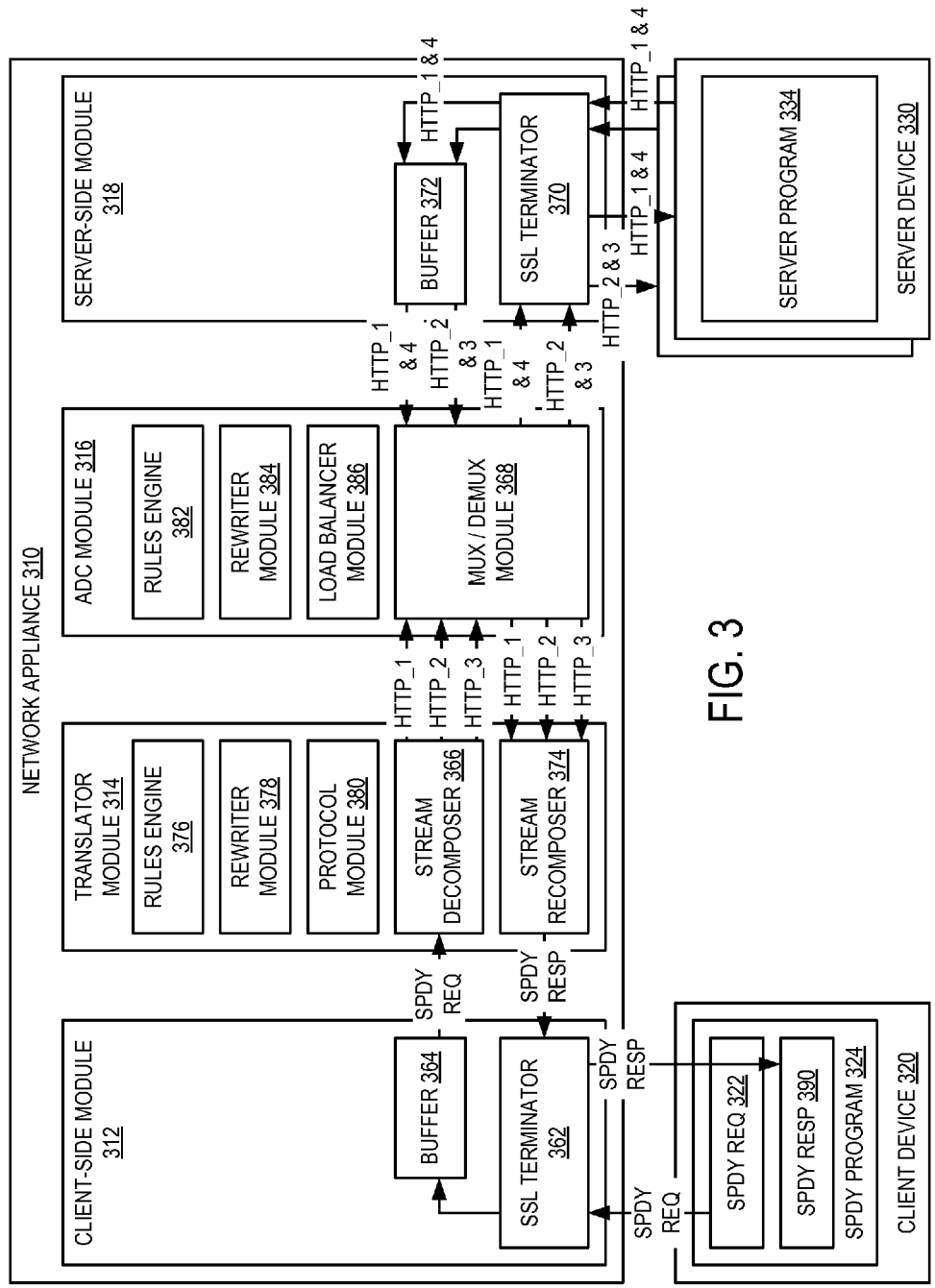
FIG. 3 is a schematic diagram depicting internal details of the example network communications system of FIG. 1 according to one disclosed embodiment.

FIG. 3 is a schematic diagram depicting the internal details of the example network communications system of FIG. 1 according to one disclosed embodiment. FIG. 3 depicts a network appliance 310 including a client-side module 312, a translator module 314, an application delivery controller (ADC) module 316, and a server-side module 318, which may collectively correspond to previously described instructions 114 of network appliance 110. In FIG. 3, a SPDY program 324 (i.e., a program enabled to communicate by the SPDY protocol) of client device 320 is depicted sending a SPDY request stream 322 to network appliance 310, for example, over a single TCP connection in the request direction of a client-side wide area network. For example, the SPDY request stream 322 may be transmitted by the client device by multiplexing multiple SPDY requests over a single TCP connection. SPDY program 324 may correspond to previously described browser program 124 of client device 120, for example. SPDY request stream 322 of FIG. 3 is a non-limiting example of an HTTP non-compliant request stream.

SPDY request stream 322 may be received by client-side module 312 of network appliance 310 via the single TCP connection in the request direction of the client-side wide area network, for example. It will be appreciated that one feature of the SPDY application level protocol is the use of a single TCP connection for carrying multiplexed communications in a particular direction (e.g., request direction or response direction) between the client device and a server or network appliance. In addition, an SSL (secure sockets layer) or other TLS (transport layer security) terminator 362 of client-side module 312 may be configured to decrypt SPDY request stream 322, for example, if SPDY request stream 322 was encrypted at client device 320. A buffer 364 of client-side module 312 may be configured to buffer SPDY request stream 322.

Translator module 314 may be configured to translate SPDY request stream 322 into an HTTP compliant request stream, for example, as previously described with reference to method 200 of FIG. 2. Translator module 314 may include a rules engine 376 having a user-defined ruleset including HTTP non-compliant request rules and/or HTTP non-compliant response rules. Rules engine 376 may be configured to examine, for example, an incoming HTTP non-compliant request or request stream or an incoming HTTP compliant response or response stream, and determine whether to apply a rule, whereby each rule has a condition upon which an action is taken. Rules engine 314 may be configured to instruct one or more of rewriter module 378, protocol module 380, stream decomposer 366, or stream recomposer 374 to perform respective actions in accordance with one or more rules to be applied by rules engine 376 for processing HTTP compliant and HTTP non-compliant request/response streams. However, it will be appreciated that one or more of the modules of translator module 314 may also have default rules that may be applied without necessarily receiving instructions from rules engine 376.

Translator module 314 may include rewriter module 378 configured to modify (e.g., rewrite) one or more of a URL, a header, or a data payload of the HTTP non-compliant requests of the HTTP non-compliant request stream. Rewriter module 378 may modify the HTTP non-compliant request stream in response to instructions received from rules engine 376 or based on default rules. As one example, rewriter module 378 may be configured to modify headers of the HTTP non-compliant request stream to include an IP address of the client device, header map, and/or cookie. Another example of modifying HTTP non-compliant request streams includes rejecting certain HTTP non-compliant requests (e.g., refuse connections from a particular geographic region or IP address). Rewriter module 378 may modify an HTTP non-compliant request stream by filtering one or more HTTP non-compliant requests from the HTTP non-compliant request stream.

Translator module 314 may further include protocol module 380 configured to select the HTTP non-compliant protocol as a selected protocol of a plurality of protocols supported by the network appliance (e.g., as indicated by the network appliance at 212 of method 200). Protocol module 380 may select a protocol in response to instructions received from rules engine 376 or based on default rules. HTTP compliant requests of the HTTP compliant request stream translated from incoming HTTP non-compliant requests of the HTTP non-compliant request stream may be forwarded from translator module 314 to ADC module 316. In this manner a single network appliance may be configured to translate from a variety of enhanced protocols to HTTP compliant streams, and back.

A stream decomposer 366 of translator module 314 may be configured to translate one or more SPDY requests of SPDY request stream 322 into one or more HTTP compliant requests (e.g., HTTP_1, HTTP_2, HTTP_3, etc.) of an HTTP compliant request stream of a given client device by demultiplexing SPDY request stream 322 from the application level protocol specified number of TCP connections (e.g., a single TCP connection for the SPDY application level protocol). Accordingly, translator module 314 may be configured to terminate TCP connections or may function as a TCP terminator in at least some implementations. As another example, stream decomposer 366 may be configured to translate the SPDY request stream at least in part by uncompressing respective headers of the one or more SPDY requests of the SPDY request stream to the one or more HTTP compliant requests of the HTTP compliant request stream. Stream decomposer 366 may be configured to receive instructions from rules engine 376 and may perform actions in response thereto or based on default instructions.

Application delivery controller (ADC) module 316 may include a rules engine 382 having a user-defined ruleset including HTTP compliant request rules and HTTP compliant response rules. Rules engine 382 may be configured to examine, for example, an incoming HTTP compliant request or an incoming HTTP compliant response, and determine whether to apply a rule, whereby each rule has a condition upon which an action is taken. Rules engine 382 may, for example, receive HTTP compliant requests, apply HTTP compliant request rules to the incoming HTTP compliant requests, to thereby produce modified HTTP compliant requests (e.g., via rewriter module 384), and send the modified HTTP compliant requests to one or more servers. Rules engine 382 may be configured to instruct one or more of rewriter module 384, load balancer module 386, or multiplexer/demultiplexer module 368 to perform respective actions in accordance with one or more rules to be applied by rules engine 382 for processing HTTP compliant request/response streams. However, it will be appreciated that modules of ADC module 316 may also have default rules that may be applied without necessarily receiving instructions from rules engine 382.

ADC module 316 may include rewriter module 384 configured to modify one or more of a URL, a header, or a data payload of the HTTP compliant request stream before forwarding the HTTP compliant request stream to the one or more server devices. Rewriter module 384 may modify the HTTP compliant request stream in response to instructions received from rules engine 382 or based on default rules. As one example, rewriter module 384 may be configured to modify (e.g., rewrite) headers of the HTTP compliant request stream to include an IP address of the client device, header map, and/or cookie. Another example of modifying HTTP compliant request streams includes rejecting certain HTTP compliant requests (e.g., refuse connections from a particular geographic region or IP address). Modifying an HTTP compliant request stream by rewriter module 378 may include filtering one or more HTTP compliant requests from the HTTP compliant request stream.

ADC module 316 may include load balancer module 386 configured to load balance the forwarded HTTP compliant requests of the HTTP compliant request stream among a plurality of server devices. Load balancer module 386 may receive instructions from rules engine 382 or may utilize default rules, and may act in accordance with the instructions or default rules to direct HTTP requests to specific server devices. ADC module 316 may include a multiplexer/demultiplexer module 368 configured to multiplex one or more HTTP compliant requests of the HTTP compliant request stream of client device 320 with one or more other HTTP complaint requests (e.g., HTTP_4) of one or more other client devices for transmission over a programmatically specified server-side number of TCP connections with server devices over the server-side network. Accordingly, ADC module 316 may be configured to terminate TCP connections or may function as a TCP terminator in at least some implementations. Multiplexer/demultiplexer module 368 may receive instructions from rules engine 382 or may utilize default rules, and may act in accordance with the instructions or default rules to multiplex or demultiplex HTTP requests or responses. In at least some implementations, multiplexer/demultiplexer module 368 of network appliance 310 may multiplex request streams of one or more client devices at the server-side to utilize smaller number of persistent connections between the network appliance and server devices, and thereby reduce network appliance and server processing overhead associated with managing large numbers of TCP connections. For example, HTTP compliant requests HTTP_1 and HTTP_4 of different client devices are shown multiplexed over a single TCP connection as HTTP_1 & 4.

An SSL terminator 370 of server-side module 318 may be configured to encrypt or re-encrypt the HTTP compliant request stream. Server-side module 318 may be configured to send respective requests of HTTP compliant request stream to one or more server devices such as server device 330, for example, via a server-side local area network over a plurality of established TCP connections. The one or more server devices, including server device 330 may receive, process, and respond to the one or more HTTP compliant requests of the HTTP compliant request stream (e.g., at server program 334) by sending an HTTP compliant response stream including one or more HTTP compliant responses (e.g., HTTP_1 & 4 and HTTP_2 & 3).

An HTTP compliant response stream including one or more HTTP compliant responses (e.g., HTTP_1 & 4 and HTTP_2 & 3) may be received by server-side module 318 of network appliance 310 via the plurality of TCP connections of the server-side local area network, for example. SSL terminator 370 of server-side module 318 may be configured to decrypt the HTTP compliant response stream, for example, if the HTTP compliant response stream was encrypted at the one or more server devices. A buffer 372 of server-side module 318 may be configured to buffer the HTTP compliant response stream.

Rules engine 382 of ADC module 316 may receive HTTP compliant responses, apply HTTP compliant response rules to the incoming HTTP compliant responses, to thereby produce modified HTTP compliant responses (e.g., via rewriter module 384) before sending the modified HTTP compliant responses to translator module 314. Rewriter module 384 of ADC module 316 may be configured to modify one or more of a URL, a header, or a data payload of the HTTP compliant response stream before forwarding the HTTP compliant response stream to the client device. Rewriter module 384 may modify the HTTP compliant response stream in response to commands received from rules engine 382 or based on default rules. Multiplexer/demultiplexer module 368 of ADC module 316 may be configured to demultiplex HTTP compliant responses for a given client of the HTTP compliant response stream from one or more other HTTP compliant responses for one or more other client devices. For example, HTTP compliant responses HTTP_1 and HTTP_4 for different client devices may be demultiplexed from a common TCP connection as HTTP_1 & 4 to individual HTTP requests HTTP_1 and HTTP_4. ADC module 316 may forward the HTTP compliant responses to translator module 314.

Translator module 314 may be configured to translate the HTTP compliant response stream into SPDY response stream 390, for example, as previously described with reference to method 200 of FIG. 2. In at least some implementations, a stream recomposer 374 of translator module 314 may be configured to translate the one or more HTTP compliant responses (e.g., HTTP_1, HTTP_2, HTTP_3, etc.) of the HTTP compliant response stream into the one or more responses formatted according to the SPDY application level protocol of SPDY response stream 390 by multiplexing the HTTP compliant responses to the application level protocol specified number of client-side TCP connections (e.g., a single TCP connection in the response direction in the context of the SPDY application level protocol). As another example, stream recomposer 374 may be configured to translate the HTTP compliant response stream at least in part by compressing respective headers of the one or more HTTP compliant application level protocol responses of the HTTP compliant response stream to one or more responses of a SPDY response stream 390. Rewriter module 378 configured to modify one or more of a URL, a header, or a data payload of the HTTP non-compliant response stream. Rewriter module 378 may be configured to modify the HTTP non-compliant response stream in response to commands received from rules engine 376 or based on default rules.

SSL terminator 362 of client-side module 312 may be configured to encrypt or re-encrypt SPDY response stream 390. Client-side module 312 may be configured to send SPDY response stream 390 to client device 320, for example, via a client-side wide area network over an established single TCP connection in the response direction. Client device 320 may receive, and process SPDY response stream 390. SPDY response stream 390 of FIG. 3 is a non-limiting example of an HTTP non-compliant response stream.

Figure 4:
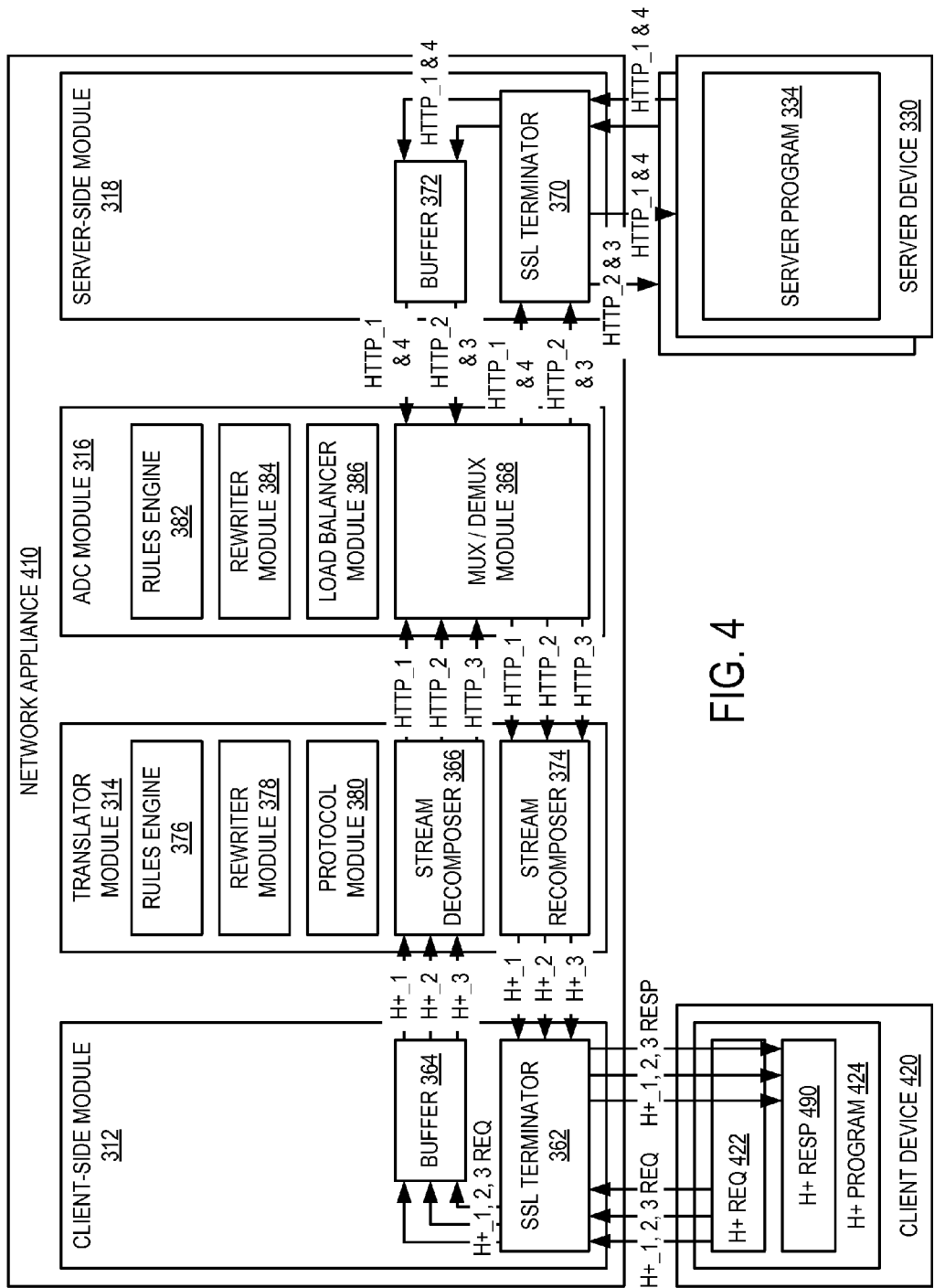
FIG. 4 is a schematic diagram depicting internal details of the example network communications system of FIG. 1 according to another disclosed embodiment.

FIG. 4 is a schematic diagram depicting the internal details of the example network communications system of FIG. 1 according to another disclosed embodiment. FIG. 4 depicts a network appliance 410 including a number of elements previously described with reference to FIG. 3. In FIG. 4, an enhanced HTTP (HTTP+) program 424 of client device 420 is depicted sending an enhanced HTTP compliant request stream 422 to network appliance 410, for example, over a plurality of TCP connections of a client-side wide area network. In this example, the application level protocol specified number of client-side TCP connections includes at least two client-side TCP connections for the HTTP non-compliant requests. Exemplary methods that may be used by the system of FIG. 4 to increase parallelism in TCP connections are described in co-pending U.S. patent application Ser. No. 13/004,894, entitled NETWORK RESOURCE MODIFICATION FOR HIGHER NETWORK CONNECTION CONCURRENCE, filed Jan. 12, 2011, the entire disclosure of which is herein incorporated by reference. Enhanced HTTP program 424 may correspond to previously described browser program 124 of client device 120, for example. Enhanced HTTP compliant request stream 422 of FIG. 3 is a non-limiting example of an HTTP non-compliant request stream.

Enhanced HTTP compliant request stream 422 may be received by client-side module 312 of network appliance 310 via a plurality of TCP connections of the client-side wide area network, for example. Enhanced HTTP compliant request stream 422 may be received over a number of parallel TCP connections, in contrast to SPDY where a single TCP connection is utilized for the SPDY request stream. An SSL terminator 362 of client-side module 312 may be configured to decrypt enhanced HTTP compliant request stream 422, for example, if enhanced HTTP compliant request stream 422 was encrypted at client device 420. A buffer 364 of client-side module 312 may be configured to buffer enhanced HTTP compliant request stream 422. Translator module 314 may be configured to translate enhanced request stream 422 into an HTTP compliant request stream. The HTTP compliant request stream may be processed as previously described with reference to FIG. 3. However, in FIG. 4, the HTTP enhanced request stream is not initially multiplexed over a lesser number of TCP connections than the HTTP compliant request stream; rather, increased parallelism of TCP connections is used to decrease the effect of slowed data transmission rates on any one TCP connection. Accordingly, translator module 314 does not perform demultiplexing of the HTTP enhanced request stream in this example implementation.

The HTTP compliant response stream may be processed as previously described with reference to FIG. 3. For example, translator module 314 may be configured to translate an HTTP compliant response stream into an enhanced HTTP compliant response stream 490. In at least some implementations, a stream recomposer 374 of translator module 314 may be configured to translate the one or more HTTP compliant responses (e.g., HTTP_1, HTTP_2, HTTP_3, etc.) of the HTTP compliant response stream into the one or more enhanced HTTP responses formatted according to the enhanced HTTP application level protocol of enhanced HTTP compliant response stream 490. In FIG. 4, the HTTP enhanced response stream is not multiplexed over a lesser number of TCP connections than the HTTP compliant response stream; rather, increased TCP parallelism is used for robust data transmission. Accordingly, translator module 314 may not perform multiplexing to obtain the HTTP compliant response stream in this particular implementation.

SSL terminator 362 of client-side module 312 may be configured to encrypt or re-encrypt an enhanced HTTP compliant response stream 490. Client-side module 312 may be configured to send enhanced HTTP compliant response stream 390 to client device 420, for example, via a client-side wide area network over the established TCP connections. Client device 420 may receive, and process enhanced HTTP compliant response stream 490. Enhanced HTTP response stream 490 of FIG. 4 is a non-limiting example of an HTTP non-compliant response stream.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A network communications system, comprising:
a network appliance configured to:
receive from a client device via a client-side wide area network, an HTTP non-compliant request stream including one or more HTTP non-compliant requests formatted according to an HTTP non-compliant application level protocol;
translate the one or more HTTP non-compliant requests of the HTTP non-compliant request stream from the HTTP non-compliant application level protocol into one or more HTTP compliant requests of an HTTP compliant request stream;

forward the HTTP compliant request stream including the one or more HTTP compliant requests to one or more server devices via a server-side local area network;

receive an HTTP compliant response stream including one or more HTTP compliant responses from the one or more server devices via the server-side local area network, the one or more HTTP compliant responses responsive to the one or more HTTP compliant requests;

translate the one or more HTTP compliant responses of the HTTP compliant response stream into one or more HTTP non-compliant responses of an HTTP non-compliant response stream formatted according to the HTTP non-compliant application level protocol; and forward the HTTP non-compliant response stream including the one or more HTTP non-compliant responses to the client device via the client-side wide area network;

the network appliance including a translator module and an application delivery controller module;

the translator module including one or more of:
a rewriter module configured to modify one or more of a URL, a header, or a data payload of the HTTP non-compliant request stream or the HTTP non-compliant response stream;
a protocol module configured to select the HTTP non-compliant protocol from a plurality of protocols supported by the network appliance;
a stream decomposer configured to translate the HTTP non-compliant request stream into the HTTP compliant request stream;
a stream recomposer configured to translate the HTTP compliant response stream into the HTTP non-compliant response stream; and
a rules engine configured to instruct one or more of the rewriter module of the translator module, protocol module, stream decomposer, or stream recomposer to perform respective actions in accordance with the one or more rules upon satisfaction of a respective condition associated with each rule;

the application delivery controller module including one or more of:
a rewriter module configured to modify one or more of a URL, a header, or a data payload of the HTTP compliant request stream or the HTTP compliant response stream;
a load balancer module configured to load balance the forwarded HTTP compliant requests of the HTTP compliant request stream among a plurality of server devices including the one or more server devices;
a multiplexer/demultiplexer module configured to multiplex one or more of the HTTP compliant requests of the client device with one or more other HTTP compliant requests of one or more other client devices, and demultiplex one or more of the HTTP compliant responses for the client device from one or more other HTTP compliant responses for one or more other client devices; and
a rules engine configured to instruct one or more of the rewriter module of the application delivery controller, load balancer module, or multiplexer/demultiplexer module to perform respective actions in accordance with the one or more rules upon satisfaction of a respective condition associated with each rule.

2. The system of claim 1, wherein the network appliance is further configured to:
translate the one or more HTTP non-compliant requests of the HTTP non-compliant request stream into the one or more HTTP compliant requests of the HTTP compliant request stream by demultiplexing the one or more HTTP non-compliant requests; and
translate the one or more HTTP compliant responses of the HTTP compliant response stream into the one or more HTTP non-compliant responses formatted according to the HTTP non-compliant application level protocol of the HTTP non-compliant response stream by multiplexing the HTTP compliant responses.

3. The system of claim 1, wherein the network appliance is further configured to:
translate the HTTP non-compliant request stream at least in part by uncompressing respective headers of the one or more HTTP non-compliant requests to the one or more HTTP compliant requests; and
translate the HTTP compliant response stream at least in part by compressing respective headers of the one or more HTTP compliant responses to the one or more HTTP non-compliant responses.

4. The system of claim 1, wherein the network appliance is further configured to:
prior to receiving the HTTP non-compliant request stream from the client device, receive an indication from the client device via the client-side wide area network that the client device supports the HTTP non-compliant application level protocol; and
send an indication of one or more application level protocols supported by the network appliance to the client device via the client side network, including at least the HTTP non-compliant application level protocol.

5. The system of claim 1, wherein the network appliance is further configured to:
decrypt the HTTP non-compliant request stream prior to translating the HTTP non-compliant request stream;
re-encrypt the HTTP compliant request stream prior to forwarding the HTTP compliant request stream to the one or more server devices;
decrypt the HTTP compliant response stream prior to translating the HTTP compliant response stream; and
re-encrypt the HTTP non-compliant response stream prior to forwarding the HTTP non-compliant response stream to the client device.

6. The system of claim 1, wherein the network appliance is further configured to:
identify a performance parameter of an existing TCP connection between the client device and the network appliance; and
initiate a new TCP connection between the client device and the network appliance based, at least in part, on the performance parameter of the existing TCP connection exceeding a threshold.

7. The system of claim 1, wherein the network appliance and the one or more server devices are included in a data center and are connected or connectable to each other via the server-side local area network.

8. A network communications method, comprising:
receiving at a client-side module of a network appliance of a data center from a client device via a client-side wide area network, an HTTP non-compliant request stream including one or more HTTP non-compliant requests formatted according to an HTTP non-compliant application level protocol;

translating at a translator module of the network appliance, the one or more HTTP non-compliant requests of the HTTP non-compliant request stream from the HTTP non-compliant application level protocol into one or more HTTP compliant requests of an HTTP compliant request stream by uncompressing respective headers of the one or more HTTP non-compliant requests and demultiplexing the one or more HTTP non-compliant requests;

multiplexing the one or more HTTP compliant requests of the client device with one or more other HTTP compliant request of one or more other client devices at an application delivery controller module of the network appliance;

forwarding the HTTP compliant request stream from a server-side module of the network appliance to one or more server devices of the data center via a server-side local area network;

receiving at the server-side module of the network appliance, an HTTP compliant response stream including one or more HTTP compliant responses for the client device from the one or more server devices via the server-side local area network, the one or more HTTP compliant responses responsive to the one or more HTTP compliant requests;

demultiplexing the one or more HTTP compliant responses for the client device from one or more other HTTP compliant responses for one or more other client devices at the application delivery controller module of the network appliance;

translating at the translator module of the network appliance, the one or more HTTP compliant responses of the HTTP compliant response stream into one or more HTTP non-compliant responses of an HTTP non-compliant response stream formatted according to the HTTP non-compliant application level protocol by compressing respective headers of the one or more HTTP compliant responses and multiplexing the HTTP compliant responses; and forwarding the HTTP non-compliant response stream from the client-side module of the network appliance to the client device via the client-side wide area network.

9. The method of claim 8, further comprising:
prior to receiving the HTTP non-compliant request stream from the client device, receiving an indication from the client device via the client-side wide area network that the client device supports the HTTP non-compliant application level protocol; and sending an indication of one or more application level protocols supported by the network appliance to the client device via the client side network, including at least the HTTP non-compliant application level protocol.

10. The method of claim 8, further comprising:
decrypting the HTTP non-compliant request stream prior to translating the HTTP non-compliant request stream;
re-encrypting the HTTP compliant request stream prior to forwarding the HTTP compliant request stream to the one or more server devices;
decrypting the HTTP compliant response stream prior to translating the HTTP compliant response stream; and
re-encrypting the HTTP non-compliant response stream prior to forwarding the HTTP non-compliant response stream to the client device.

11. The method of claim 8, further comprising:
identifying a performance parameter of an existing TCP connection between the client device and the network appliance; and
initiating a new TCP connection between the client device and the network appliance based, at least in part, on the performance parameter of the existing TCP connection exceeding a threshold.

12. The method of claim 11, further comprising:
wherein the performance parameter includes one or more of: round trip time, packet loss, TCP receive window, or congestion window.

\* \* \* \* \*